: 3,786,153
CONTROL OF VAMPIRE BATS
Roy D. Thompson and Charles P. Breidenstein, Lakewood, Colo., assignors to the United States of America as represented by the Secretary of the Interior
No Drawing. Filed Apr. 24, 1972, Ser. No. 247,168
Int. Cl. A01n 9/24, 9/28
U.S. Cl. 424—281                      4 Claims

ABSTRACT OF THE DISCLOSURE

Population reduction of vampire bats is accomplished by means of a toxicant administered systemically to host animals, particularly cattle. The toxicant is administered in an amount that is harmless to the host animal but is lethal to vampires that feed on the blood of the host.

---

An estimated one million head of cattle die annually from rabies transmitted by vampire bats, whose range extends from northern Argentina to tropical Mexico. Effective and economical methods are, therefore, needed to reduce vampire bat populations in areas where bat-borne rabies is a problem.

Control of vampire bats presents unusual problems. The animals are nocturnal, highly mobile, and their roosts are frequently located in rugged and heavily vegetated terrain. Because they feed exclusively on the fresh blood of live birds and mammals, conventional control techniques cannot be used, and they rarely concentrate at feeding sites in large enough numbers to make trapping or netting effective as a widespread control measure. They normally roost in numerous scattered sites, most of which are hard to locate and contain relatively few vampire bats. In addition, they may frequently move from roost to roost and commonly share their roosts with beneficial species of bats. Thus, selective control within the roost is difficult even when their refuges are found.

However, many behavioral characteristics of the common vampire bat, *Desmodus rotundus*, as well as other species of vampires, have been observed. Generally, they must feed at least once every 2 or 3 days, the food consisting exclusively of the whole blood of live animals. When feeding, it is common for the vampire to consume from 50 to 100% of its body weight in whole fresh blood. Although the water constituent of this consumed blood is eliminated almost immediately, the other constituents are retained. This, in effect, concentrates the non-water soluble portion of the consumed blood in the vampire's relatively small circulatory system.

It has now been found, in accordance with the present invention, that the above characteristics make possible an efficient and economical means for reducing vampire bat populations. This is achieved by a method comprising administering a toxicant systemically to host animals, generally cattle. Such a method is feasible in any situation where the toxicant can be administered in concentrations that are harmless to the host animal but lethal to the vampires that feed on the host. The method has been found most effective when the host animals are cattle; however, the method is also applicable to other host animals such as horses, sheep, goats and swine.

Anticoagulants have been found to be effective toxicants for use in the method of the invention. These compounds, when absorbed into the circulatory system of host or bat, temporarily bind to plasma protein and decrease clotting ability by inhibiting prothrombin synthesis in the liver. A preferred anticoagulant is diphenadione, i.e., 2-diphenylacetyl-1,3-indandione, disclosed in U.S. Pat. 2,672,483. This compound has been found to be particularly effective in the practice of the invention since it is very toxic to Desmodus (acute $LD_{50}$ between 0.20 and 0.91 mg./kg.), but a single dose up to 5.0 mg./kg. (5.0 milligrams toxicant/kilogram of body weight) produces only a transient and harmless increase in plasma prothrombin and whole blood clotting time in cattle. Other suitable anticoagulants include 1,3-indandione derivatives such as chlorophacinone, i.e., 2-(parachlorophenyl)phenylacetyl-1,3-indandione and coumarin derivatives such as warfarin, i.e., 3-(α-acetonylbenzyl)-4-hydroxycoumarin, Tomorin, i.e., 3-(α-acetonyl-4-chlorobenzyl)-4-hydroxycoumarin and Fumarin, i.e., 3-(α-acetonylfurfuryl)-4-hydroxycoumarin.

Administration of the toxicant to the host animal may be by any means by which the toxicant becomes absorbed into the circulatory system of the host. E.g., it may be administered orally in gelatine capsules by means of a balling gun, or by injection by means of a syringe using water as a carrier. Since the anticoagulants are generally insoluble in water, a water-soluble suspending agent such as Carbopol 941 (a synthetic suspending agent formed from carboxyvinyl polymers and available from B. F. Goodrich Chemical Co.) or gum tragacanth must be used to obtain a water dispersion suitable for injection.

Ordinarily, all host animals subject to attack by the vampires are given a single dose, which is lethal to most bats up to about 3 days after dosing. Optimum size of the dose will, of course, vary with the specific toxicant used, the particular type of host animal and the specific species of bat, but a dose of about 0.5 to 5.0 mg./kg. is generally satisfactory, with a dose of about 1.0 mg./kg. generally being preferred.

The invention will be more specifically illustrated by the following example.

EXAMPLE

The effectiveness of the method of the invention in reducing vampire bat predation was demonstrated at three adjoining ranches in the State of San Luis Potosi, Mexico. The ranches encompassed an area of approximately 1.5 square miles. Predation intensity was determined at each ranch approximately 30 days before applying control, and also at the time the toxicant was administered, by careful observation and recording of the number of fresh vampire bat bites on each animal (cows, calves, and bulls). Bites were distinguished by fresh rivulets of blood or by reddish or pinkish color or bite wounds. The bite count 30 days prior to treatment averaged 1.20 per animal and 1.05 per animal when control treatment was administered. The two bite counts indicated that predation intensity was consistent and moderately severe.

To apply the control a total of 207 head of cattle were either tethered or herded into chutes and the number of pretreatment fresh bites recorded. Body weight of each animal was estimated. One mg./kg. of diphenadione was injected into the rumen compartment of the stomach on the left side with a pistol grip automatic syringe. Rumen puncture was made with a 14 ga. 1½ inch disposable needle. For injection the diphenadione was formulated into a 50 mg./ml. suspension in a neutralized water solution containing 0.05 percent Carbopol 941. Cattle were released to pasture after treatment.

Predation intensity was determined again 13 to 15 days after dosage. Control effectiveness is based on the difference between pretreatment and post-treatment bite counts. Results are shown in the following table.

| Test site | Pretreatment | | Post-treatment | | |
|---|---|---|---|---|---|
| | Number of animals treated | Number of fresh bites | Number of animals evaluated | Number of fresh bites | Percent reduction in biting |
| 1 | 93 | 80 | 84 | 5 | 93.8 |
| 2 | 71 | 88 | 77 | 9 | 89.8 |
| 3 | 43 | 46 | 49 | 1 | 97.8 |
| Total | 207 | 214 | 210 | 15 | 93.0 |

As is evident from the table, the diphenadione was very effective in reducing vampire bite predation. A total of 214 fresh bites were counted on 207 head of cattle prior to treatment and only 15 on 210 head approximately two weeks after dosing. This is equivalent to a 93% reduction in predation. Chi square analysis showed that the magnitude of bite reduction is highly significant ($p<0.01$) and that the treatment was equally effective at the three ranches. No ill effect were exhibited by the cattle following the treatment.

The method of the invention is advantageous in a number of respects. No human contact with the bats is required. The method is highly specific for vampires that feed on the blood of particular hosts, such as cattle. With proper selection, e.g., diphenadione for treatment of cattle, the toxicant is safe to the host in doses of at least five times the amount required to render the host blood toxic to the vampires for three days after dosing. Furthermore, vitamin K is an effective antidote for counteracting the prothrombinopenia effects of the anticoagulants in case of an overdose. And there are no dangerous or long term meat or milk residue problems associated with the treatment. Meat of the treated animals may be eaten 30 days after treatment with no residue problem, and the level of the anticoagulant in the milk of lactating cows after a single dose of 2.75 mg./kg. is extremely low or nondetectable. Finally, treatments of the host animals can be administered rapidly, especially if the animals are corralled or lined up in a chute for injection of the toxicant, and the method can therefore be fitted into a livestock management program and is applicable to an efficient large scale vampire eradication program.

We claim:

1. A method of reducing vampire bat populations comprising administering to host animals selected from the group consisting of cattle, horses, sheep, goats and swine an anticoagulant selected from the group consisting of 2-diphenylacetyl-1,3-indandione,
2-(parachlorophenyl)phenylacetyl-1,3-indandione,
3-($\alpha$-acetonylbenzyl)-4-hydroxycoumarin,
3-($\alpha$-acetonyl-4-chlorobenzyl)-4-hydroxycoumarin, and
3-($\alpha$-acetonylfurfuryl)-4-hydroxycoumarin in a dosage that is harmless to the host animals but is lethal to vampire bats that feed on the blood of the host animals.

2. The method of claim 1 in which the host animals are cattle.

3. The method of claim 1 in which the anticoagulant is 2-diphenylacetyl-1,3-indandione.

4. The method of claim 3 in which the dosage is about 0.5 to 5.0 mg./kg.

References Cited

Goodman and Gilman, The Pharmacological Basis of Therapeutics, 3rd ed., 1965, p. 1450.

Wilson and Grisvold, "Textbook of Medicinal & Pharmaceutical Chemistry," 4th ed. (1962).

ALBERT T. MEYERS, Primary Examiner

L. SCHENKMAN, Assistant Examiner

U.S. Cl. X.R.

424—331